United States Patent
Shibuya et al.

(10) Patent No.: US 10,671,340 B2
(45) Date of Patent: Jun. 2, 2020

(54) INFORMATION PROCESSING APPARATUS AND INFORMATION PROCESSING METHOD

(71) Applicant: SONY CORPORATION, Tokyo (JP)

(72) Inventors: Naoki Shibuya, Chiba (JP); Makoto Murata, Kanagawa (JP); Masafumi Kato, Kanagawa (JP); Kengo Yoshii, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/089,031

(22) PCT Filed: Dec. 28, 2016

(86) PCT No.: PCT/JP2016/089186
§ 371 (c)(1),
(2) Date: Sep. 27, 2018

(87) PCT Pub. No.: WO2017/175432
PCT Pub. Date: Oct. 12, 2017

(65) Prior Publication Data
US 2019/0107993 A1 Apr. 11, 2019

(30) Foreign Application Priority Data

Apr. 5, 2016 (JP) ................. 2016-076027

(51) Int. Cl.
*G06F 17/00* (2019.01)
*G06F 3/16* (2006.01)
*G10L 13/08* (2013.01)

(52) U.S. Cl.
CPC ............... *G06F 3/165* (2013.01); *G06F 3/16* (2013.01); *G06F 3/167* (2013.01); *G10L 13/08* (2013.01)

(58) Field of Classification Search
CPC ............ G06F 3/165; G06F 3/167; G06F 3/16
See application file for complete search history.

(56) References Cited

U.S. PATENT DOCUMENTS 8,379,807 B1 * 2/2013 Subramanyan ... H04M 3/42068
379/88.16
2006/0116965 A1 6/2006 Kudo et al.
(Continued)

FOREIGN PATENT DOCUMENTS

CN 103155013 A 6/2013
EP 2617021 A1 7/2013
(Continued)

OTHER PUBLICATIONS

Sawhney, et al., "Nomadic Radio: Speech and Audio Interaction for Contextual Messaging in Nomadic Environments", ACM Transactions on Computer-Human Interaction, vol. 7, Issue 3, Sep. 2000, pp. 353-383.

(Continued)

*Primary Examiner* — Joseph Saunders, Jr.
(74) *Attorney, Agent, or Firm* — Chip Law Group

(57) ABSTRACT

An information processing apparatus including an estimation section that, when it is determined that a user is able to receive vocal information presentation, estimates a duration for which it is possible to receive the information presentation and an adjustment section that adjusts an amount of information to be presented to the user in accordance with the estimated duration.

20 Claims, 11 Drawing Sheets

(56) References Cited

U.S. PATENT DOCUMENTS

| | | | |
|---|---|---|---|
| 2011/0258267 A1* | 10/2011 | Tozaki | G01C 21/3697 |
| | | | 709/206 |
| 2013/0184985 A1 | 7/2013 | Bollars | |
| 2017/0289346 A1* | 10/2017 | Suzuki | B60N 2/002 |

FOREIGN PATENT DOCUMENTS

| | | |
|---|---|---|
| JP | 05-232982 A | 9/1993 |
| JP | 2003-083752 A | 3/2003 |
| JP | 4091077 B2 | 5/2008 |
| JP | 2008-164759 A | 7/2008 |
| JP | 2009-168773 A | 7/2009 |
| JP | 2011-221766 A | 11/2011 |
| JP | 2013-538403 A | 10/2013 |
| JP | 2016-059031 A | 4/2016 |
| WO | 2005/006199 A1 | 1/2005 |
| WO | 2012/034582 A1 | 3/2012 |
| WO | 2016/038798 A1 | 3/2016 |

OTHER PUBLICATIONS

International Search Report and Written Opinion of PCT Application No. PCT/JP2016/089186, dated Mar. 28, 2017, 12 pages of ISRWO.

Sawhney, et al., "Nomadic Radio: Speech and Audio Interaction for Contextual Messaging in Nomadic Environments", ADM Transactions on Computer-Human Interaction. vol. 7, No. 3, Sep. 2000, pp. 353-383.

* cited by examiner

| POSITION INFORMATION | DAY AND TIME | ACTION | READABLE TIME |
|---|---|---|---|
| XX INTERSECTION | WEEKDAY AM 8:00 | BICYCLE: STOP | 45 SECONDS |
| XX STREET | WEEKDAY PM 5:00 | BICYCLE: WALK | 120 SECONDS |
| XX SHOP | HOLIDAY AM 11:00 | WALKING | 15 SECONDS |
| XX INTERSECTION | WEEKDAY AM 8:03 | BICYCLE: STOP | 35 SECONDS |
| ... | ... | ... | ... |

ESTIMATION

| POSITION INFORMATION | DAY AND TIME | ACTION | READABLE TIME |
|---|---|---|---|
| XX INTERSECTION | WEEKDAY AM 8:01 | BICYCLE: STOP | 42 SECONDS |

FIG. 5

| USER ID | POSITION INFORMATION | DAY AND TIME | ACTION | READABLE TIME |
|---|---|---|---|---|
| User 1234 | XX INTERSECTION | WEEKDAY AM 8:00 | BICYCLE: STOP | 45 SECONDS |
| User 5678 | XX STREET | WEEKDAY PM 5:00 | BICYCLE: WALK | 120 SECONDS |
| User 1432 | XX SHOP | WEEKDAY AM 11:00 | WALKING | 15 SECONDS |
| User 4134 | XX INTERSECTION | WEEKDAY AM 8:03 | BICYCLE: STOP | 35 SECONDS |
| ... | ... | ... | ... | ... |

 ESTIMATION

| POSITION INFORMATION | DAY AND TIME | ACTION | READABLE TIME |
|---|---|---|---|
| XX INTERSECTION | WEEKDAY AM 8:01 | BICYCLE: STOP | 42 SECONDS |

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2016/089186 filed on Dec. 28, 2016, which claims priority benefit of Japanese Patent Application No. JP 2016-076027 filed in the Japan Patent Office on Apr. 5, 2016. Each of the above-referenced applications is hereby incorporated herein by reference in its entirety.

TECHNICAL FIELD

The present disclosure relates to an information processing apparatus, an information processing method, and a program.

BACKGROUND ART

As information processing and information communication technology has been developed in recent years, computers have been gaining widespread use and computers have been actively used even in daily life. For example, the use of a mobile communication terminal such as a smartphone or a mobile phone terminal makes it possible to view information on a network or enjoy a service of navigation to a destination when going out.

In addition, as a service that converts various kinds of text information on networks into speech and allows it to be enjoyed, for example, Patent Literature 1 below proposes a sound synthesizing method that selects articles having high interest degrees one by one from an article group in descending order of interest degrees with a condition set such as total audio time length, speech speed, or the number of essential reproduction articles, summarizes a selected article to an approximate amount, and reproduces the article with synthesized sound.

CITATION LIST

Patent Literature

Patent Literature 1: JP 2008-164759A

DISCLOSURE OF INVENTION

Technical Problem

Here, in the case where it is not possible to listen to information after vocal information presentation is started, a complicated operation is necessary such as stopping audio reproduction or turning down the volume. Visual information that is displayed for presentation only requests the line of sight to be diverted therefrom, but audio reproduction has to be stopped in the case of audio information.

The present disclosure then proposes an information processing apparatus, an information processing method, and a program capable of controlling the amount of audio information such that listening to the audio information is finished within the time within which information can be presented, and improving the convenience of the audio information presentation.

Solution to Problem

According to the present disclosure, there is proposed an information processing apparatus including: an estimation section configured to, when it is determined that a user is able to receive vocal information presentation, estimate a duration for which it is possible to receive the information presentation; and an adjustment section configured to adjust an amount of information to be presented to the user in accordance with the estimated duration.

According to the present disclosure, there is proposed an information processing method including, by a processor: estimating, when it is determined that a user is able to receive vocal information presentation, a duration for which it is possible to receive the information presentation; and adjusting an amount of information to be presented to the user in accordance with the estimated duration.

According to the present disclosure, there is proposed a program for causing a computer to function as: an estimation section configured to, when it is determined that a user is able to receive vocal information presentation, estimate a duration for which it is possible to receive the information presentation; and an adjustment section configured to adjust an amount of information to be presented to the user in accordance with the estimated duration.

Advantageous Effects of Invention

According to the present disclosure as described above, it is possible to control the amount of audio information such that listening to the audio information is finished within the time within which information presentation can be received, and improve the convenience of the audio information presentation.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 5 is a diagram for describing estimation of a readable time based on action histories of all users according to the present embodiment.

MODE(S) FOR CARRYING OUT THE INVENTION

Figure 1:
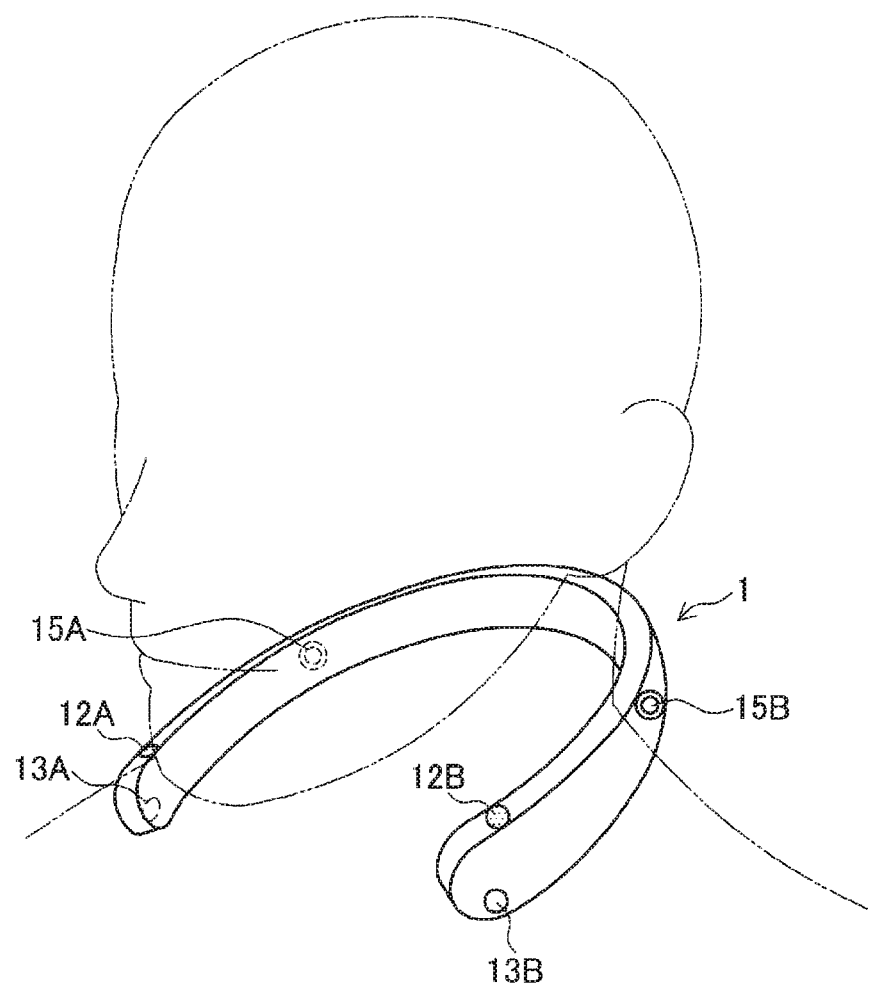
FIG. 1 is a diagram for describing an overview of an information processing apparatus according to the present embodiment.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

In addition, description will be made in the following order.
1. Overview of Information Processing Apparatus according to Embodiment of the Present Disclosure
2. Internal Configuration Example
3. Operation Processing
4. Modifications
4-1. First Modification
4-2. Second Modification
5. Conclusion

1. Overview of Information Processing Apparatus According to Embodiment of the Present Disclosure First, the overview of an information processing apparatus according to an embodiment of the present embodiment will be described with reference to FIG. 1. FIG. 1 is a perspective view illustrating an example of the exterior configuration of the information processing apparatus 1 according to the present embodiment.

As illustrated in FIG. 1, the information processing apparatus 1 according to the present embodiment may be, for example, a neckband information processing terminal that is hung around the neck of a user. The neckband information processing apparatus 1 includes a wearable unit (wearable section) shaped to extend around the half of the neck from both sides to the rear side (back side). Hung around the neck of a user, the neckband information processing apparatus 1 is worn by the user. FIG. 1 illustrates a perspective view with the wearable unit worn by a use. Note that the present specification uses the words up, down, left, right, front, and back to indicate directions, but assumes that these directions indicate directions as viewed from the center (e.g., stomach position) of the body of a user when the user is standing upright. For example, it is assumed that "right" indicates the direction toward the right half of the user's body, and "left" indicates the direction toward the left half of the user's body. "Up" indicates the direction toward the user's head, and "down" indicates the direction toward the feet of the user. In addition, it is assumed that "front" indicates the direction in which the body of the user faces, and "back" indicates the direction on the user's back side.

As illustrated in FIG. 1, the wearable unit may be worn in close contact with the neck of a user or worn with some space from the neck of a user. Note that, as other shapes of the wearable unit that is hung around the neck, for example, a pendant wearable unit worn by a user with a neck strap and a headset wearable unit including a neckband extending on the rear side of a neck instead of a headband worn around a head are possible.

In addition, a use form of the wearable unit may be a form in which the wearable unit is used by being directly worn on a human body. The form in which the wearable unit is used by being directly worn refers to a form in which the wearable unit is used with nothing between the wearable unit and the human body. For example, the case where the wearable unit illustrated in FIG. 1 is worn in contact with the neck skin of a user corresponds to this form. Besides, various forms such as a headset wearable unit and an eyeglass wearable unit that are directly worn around a head are possible. Alternatively, a use form of the wearable unit may be a form in which the wearable unit is used by being indirectly worn on a human body. The form in which the wearable unit is used by being indirectly worn refers to a form in which the wearable unit is used with something between the wearable unit and the human body. For example, the case where the wearable unit illustrated in FIG. 1 is worn in contact with a user via clothing like the wearable unit is worn and hidden under the collar of a shirt or the like corresponds to this form. Besides, various forms such as a pendant wearable unit worn by a user with a neck strap and a brooch wearable unit attached to clothing with a pin or the like are possible.

In addition, the information processing apparatus 1 according to the present embodiment includes a plurality of microphones 12 (12A and 12B), a plurality of cameras 13 (13A and 13B), and a plurality of speakers 15 (15A and 15B). The microphones 12 acquire audio data such as user speech or surrounding environmental sound. The cameras 13 image the surrounding situation and acquire captured data. In addition, the speakers 15 reproduce audio data. In FIG. 1, the microphones 12A and 12B are provided to both end sides of the information processing apparatus 1, and the cameras 13A and 13B are provided to the front parts of both ends of the information processing apparatus 1. The respective speakers 15A and 15B are provided in places in which the speakers 15A and 15B are positioned near both ears of a user when the information processing apparatus 1 is worn. The installation positions and the number of these microphones 12, cameras 13, and speakers 15 are examples, but not limited to the example illustrated in FIG. 1. For example, there may be provided one or three or more microphones 12, cameras 13, and speakers 15, or the installation positions may be different from those of FIG. 1.

Here, there is a problem that it is not possible to check visual information presentation while "doing something else" which frequently happens in daily life, when a wearable apparatus is worn to constantly receive information presentation for information collection, entertainment, and action support. For example, it is dangerous to check information presentation while walking, riding a bicycle, doing housework, and the like because they temporarily catch eyes.

In contrast, in the case of aural information presentation or vocal information presentation, it is possible to check it without the use of the hands or eyes even while "doing something else" in daily life.

In addition, as information to be presented, pull information and push information are conceivable. Pull information is information requested and presented when a user wishes to know, and activated according to a button operation, a screen operation, and a voice operation. In addition, push information is information automatically presented without a user's consciousness, and examples thereof include an e-mail notification, an incoming call, an invocation from an application, a notification, a warning of the remaining battery, and the like.

A push audio notification has the advantage that information is automatically presented. Meanwhile, a push audio notification also has the disadvantage that information is presented when a user is not able to listen to the information. In addition, in the case where a user becomes unable to listen to information after information presentation is started, an audio stopping operation is necessary. Moreover, it is not possible to check previous information unlike visual information, and it is not thus possible to easily refer to content that has been listened to before.

The present embodiment then estimates a time for which a user can receive information presentation, and controls the amount of audio information such that the user finishes listening to the audio information within the time, thereby making it possible to improve the convenience of the audio information presentation.

This allows a user to receive vocal information presentation when the user becomes able to listen to the information. In addition, the amount of information is adjusted such that information presentation is finished within a section within which a user can receive information. Accordingly, no audio stopping operation is required just because the user becomes unable to listen to information after information presentation is started.

In addition, simply conveying content that has been listened to before allows the content that has been listened to last time to be easily referred to.

2. Internal Configuration Example

Figure 2:
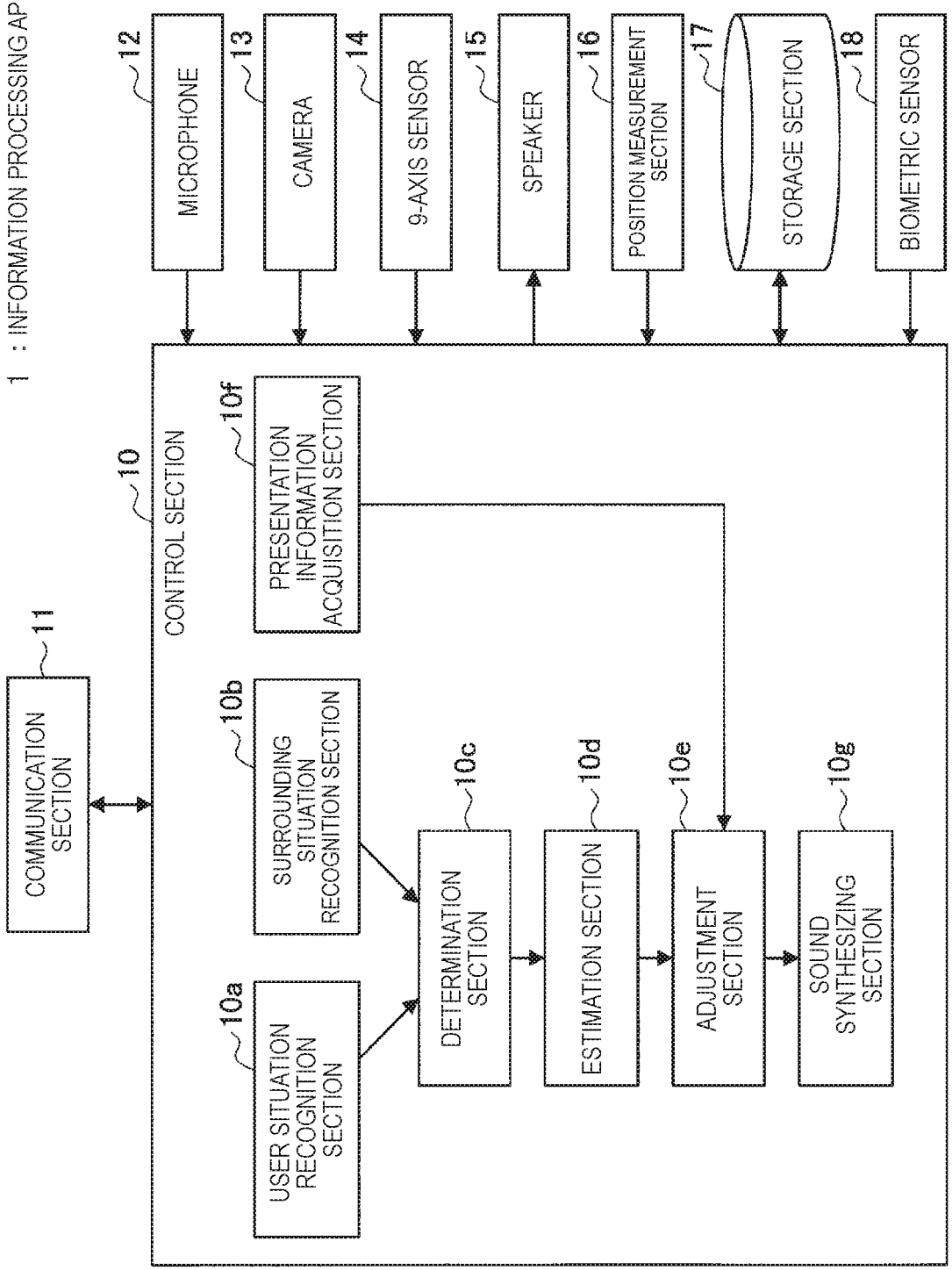
FIG. 2 is a block diagram illustrating an example of a configuration of the information processing apparatus according to the present embodiment.

Next, the internal configuration of the information processing apparatus 1 according to the present embodiment will be described with reference to FIG. 2. FIG. 2 is a block diagram illustrating an example of the internal configuration of the information processing apparatus 1 according to the present embodiment. As illustrated in FIG. 2, the information processing apparatus 1 includes a control section 10, a communication section 11, a microphone 12, a camera 13, a 9-axis sensor 14, a speaker 15, a position measurement section 16, a storage section 17, and a biometric sensor 18.

(Control Section 10)

The control section 10 functions as an operation processing apparatus and a control apparatus, and controls the overall operation of the information processing apparatus 1 in accordance with a variety of programs. The control section 10 is implemented, for example, by an electronic circuit such as a central processing unit (CPU) and a microprocessor. In addition, the control section 10 may include a read only memory (ROM) that stores a program, an operation parameter and the like to be used, and a random access memory (RAM) that temporarily stores a parameter and the like varying as appropriate.

In addition, as illustrated in FIG. 2, the control section 10 according to the present embodiment functions as a user situation recognition section 10a, a surrounding situation recognition section 10b, a determination section 10c, an estimation section 10d, an adjustment section 10e, a presentation information acquisition section 10f, and a sound synthesizing section 10g.

The user situation recognition section 10a has a function of recognizing a situation of a user on the basis of various kinds of sensor information regarding the user. For example, the user situation recognition section 10a recognizes an action of a user on the basis of user speech picked up by the microphone 12, a face image of the user which is captured by the camera 13, sensor data sensed by an acceleration sensor, a gyro sensor, a geomagnetic sensor, and the like included in the 9-axis sensor 14, and position information measured by the position measurement section 16. When an action of a user is recognized, situations of walking, running and stopping, and further detailed situations of riding a bicycle, being in an automobile, being on the train, sitting, standing, and sleeping can be grasped.

In addition, it is also possible to recognize a situation (such as a concentration degree) of a user on the basis of biometric sensor data acquired from the biometric sensor 18. Examples of the biometric sensor data include pulses, heart rates, perspiration rates, body temperature, brain waves, lines of sight (which can be detected by using an image obtained by imaging eye movement or sensing the movement of the muscles around eyes), and the like.

The surrounding situation recognition section 10b has a function of recognizing a surrounding environment of a user on the basis of various kinds of sensor information regarding the environment. For example, the user situation recognition section 10a is based on environmental sound (such as noise and sound of an automobile) picked up by the microphone 12, surrounding scenery imaged by the camera 13 and position information measured by the position measurement section 16, and a surrounding situation (such as a danger degree) of a user is recognized.

The determination section 10c determines on the basis of at least any of a situation of a user or a surrounding situation whether or not the user is able to receive vocal information presentation. The information processing apparatus 1 according to the present embodiment determines whether or not a user is able to receive information, and makes vocal information presentation in the case where the user is able to receive information. For example, the determination section 10c calculates a concentration degree on the basis of a user situation. In the case where a user is concentrating on one thing, the determination section 10c is assumed to determine that information presentation is NG. In the case where a user is relaxing, the determination section 10c is assumed to determine that information presentation is OK. In addition, depending on what kind of action a user is taking, it can be determined whether information presentation is OK or NG. For example, while a user is moving, which requires hard physical activity from the user, it is preferable that information presentation be NG. Specifically, information presentation is NG when the user is running or pedaling a bicycle, and information presentation is OK when the user is sitting or walking. More specifically, information presentation is determined as NG when the user is pedaling a bicycle with all the user's might, and information presentation is determined as OK when the user is stopping at an intersection or the like. In addition, information presentation is determined as NG while the user is running, and information presentation is determined as OK while the user is stopping at a traffic light.

In addition, the determination section 10c can determine in accordance with a surrounding situation whether or not information presentation can be received. For example, the determination section 10c calculates a surrounding danger degree (degree to which attention has to be paid) from surrounding video or sound, and determines that information presentation is NG in the case where the danger degree is high. For example, the danger degree of an intersection having heavy traffic is high, so that the determination section 10c determines that information presentation is NG. More specifically, for example, in the case where, although a user is driving an automobile, the automobile is moving smoothly, information presentation is OK. However, when attention has to be paid to the surroundings such as a crowded intersection, information presentation is determined as NG. In addition, in a place of loud surrounding noise, information presentation is determined as NG. Note that sensor data for a surrounding situation from not only the microphone 12 or the camera 13 provided to the information processing apparatus 1, but also a surveillance camera or a motion sensor installed in the vicinity may be received via the communication section 11, and used to recognize the surrounding situation.

In addition, the determination section 10c is also capable of determining whether or not a user is able to receive vocal information presentation, by comprehensively taking into consideration a "user situation" and a "surrounding situation." For example, the determination section 10c may determine a "user situation" and a "surrounding situation" separately. Only in the case where it can be determined that information presentation is OK for both situations, the determination section 10c may output a determination result indicating that information presentation is OK as a whole. In the case where information presentation is NG for at least any of them, the determination section 10c may also output a determination result indicating that information presentation is NG as a whole. Alternatively, the determination section 10c may determine a "user situation" and a "surrounding situation" separately, and weight and add a score showing whether or not information presentation can be received for both situations. In the case where the score exceeds a threshold, the determination section 10c may comprehensively determine that information presentation is OK.

Figure 3:
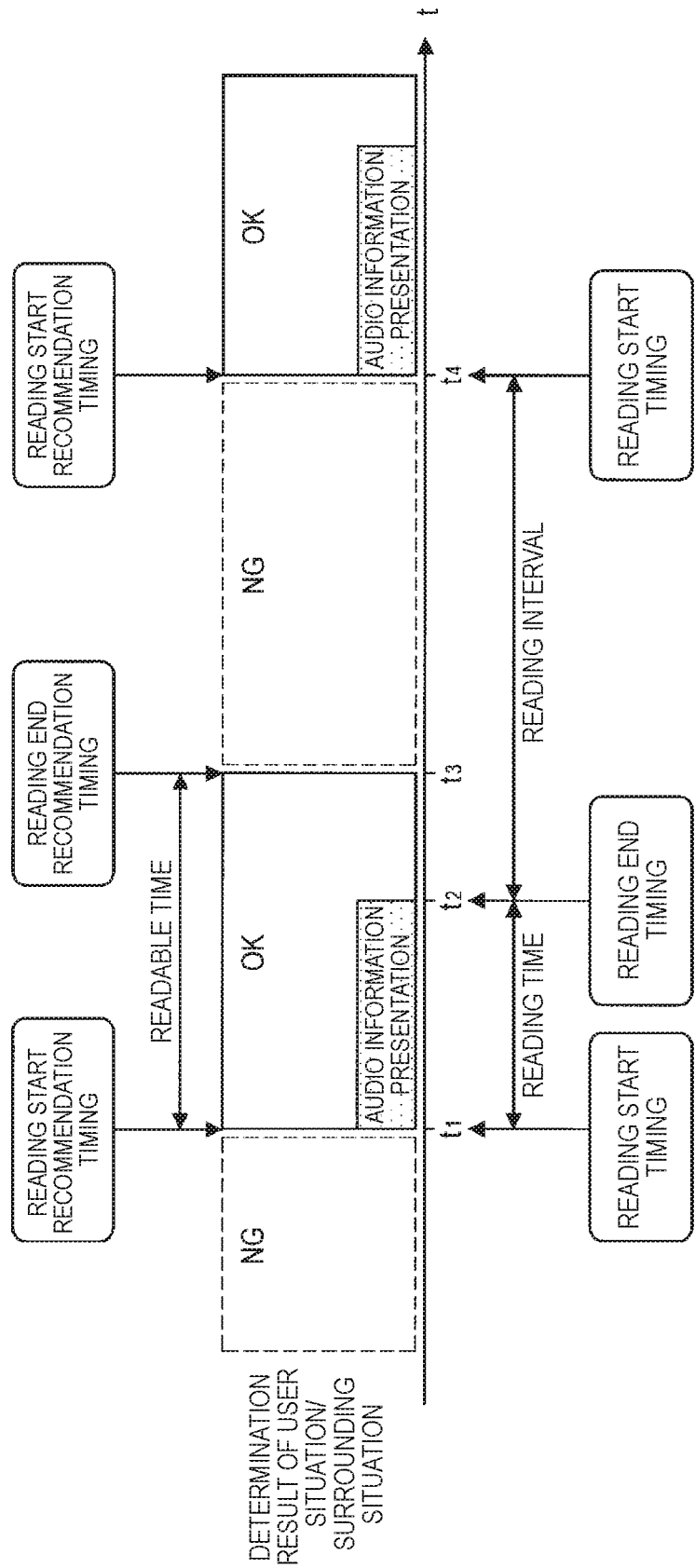
FIG. 3 is a diagram for describing audio information presentation control timing according to the present embodiment.

The estimation section 10d estimates a duration for which a user is able to receive information presentation. In the present embodiment, control is performed such that vocal information presentation is finished within a section (time) during which a user is able to receive information. For example, in the case where a user pedals a bicycle and stops at a traffic signal, the duration for which the user is able to receive information presentation is a time elapsed before the traffic light turns green and the user starts to move. FIG. 3 is a diagram for describing audio information presentation control timing according to the present embodiment. With reference to FIG. 3, the following describes a section (time) during which a user can receive information.

As illustrated in FIG. 3, reading start recommendation timing is timing t1 at which information presentation OK starts on the basis of a determination result of a user situation or a surrounding situation, and reading end recommendation timing is timing t3 at which the state of information presentation OK ends. The section from the timing t1 and the timing t3 serves as a section or a "readable time" during which a user can receive information. The information processing apparatus 1 according to the present embodiment adjusts the "reading time" (audio information presentation time) such that, for example, reading (audio information presentation) starts at the timing t1, and timing t2 at which the reading ends comes earlier than the timing t3 at which the readable time ends. The "reading time" is adjusted chiefly by controlling the amount of audio information to be presented, but the detailed description will be made below. In addition, a time from the timing t2 at which reading ends to timing t4 at which next reading starts is referred to as "reading interval."

The duration (which will be referred to as "readable time") for which a user is able to receive information presentation can be estimated, for example, on the basis of a past action history of the user himself or herself, or past action histories of all users. For example, the storage section 17 according to the present embodiment accumulates action histories (date and time, position, and action) of users on a daily basis. The estimation section 10d is then capable of statistically obtaining, on the basis of the action histories, the tendency of the relationship between the situations (position information, day and time information, and action) in which a user becomes "able to receive information" and a time (readable time) elapsed before the user becomes "unable to receive information." That is, the estimation section 10d can estimate a readable time from the average value of readable times for past similar situations in the case where a certain situation occurs. Note that the estimation section 10d is also capable of obtaining a readable time with machine learning.

Figure 4:
FIG. 4 is a diagram for describing estimation of a readable time based on an action history of a user himself or herself according to the present embodiment.

FIG. 4 is a diagram for describing the estimation of a readable time based on an action history of a user himself or herself according to the present embodiment. As illustrated in FIG. 4, for example, on the basis of histories of position information, days of the week, time, actions, and readable times, the estimation section 10d can statistically estimate that a readable time is "42 seconds" when a "bicycle stops" at "XX intersection" at "8:01 in the morning on a weekday."

In addition, the estimation section 10d according to the present embodiment is not limited to an action history of a user himself or herself, but is also capable of similarly estimating a readable time on the basis of past action histories of all users. The past action histories of all users can be acquired, for example, from a server on a network connected via the communication section 11.

FIG. 5 is a diagram for describing the estimation of a readable time based on action histories of all users according to the present embodiment. As illustrated in FIG. 5, for example, on the basis of user IDs, histories of position information, days of the week, time, actions, and readable times, the estimation section 10d can statistically estimate that a readable time is "42 seconds" when a "bicycle stops" at "XX intersection" at "8:01 in the morning on a weekday."

The above specifically describes the estimation of a readable time which uses an action history of a user himself or herself, or action histories of all users.

Note that the estimation section 10d according to the present embodiment may request action histories of all users at the current position from the server on the basis of current position information, and in the case where sufficient data necessary for the estimation is not obtained (falls below a predetermined amount), the estimation section 10d may switch to estimation based on action histories of a user himself or herself which are accumulated in the storage section 17.

In addition, in the case of estimation based on action histories of all users, the estimation section 10d may extract regularity from the action histories of all the users and use it to estimate a readable time. For example, the estimation section 10d calculates the regularity of timing at which the traffic light changes from action histories of people who have stopped at a certain traffic light within the last one hour, and estimates, when a user stops at the traffic light, a "duration for which information presentation can be received" (readable time) before the traffic light turns green and the user starts to move. In the case of traffic infrastructure such as a traffic light and a railroad crossing where actions of users and surrounding situations regularly change, the estimation section 10d can estimate the regularity of timing at which the traffic light turns green from red from position information and movement start time of all users.

As a result, it is possible to estimate how much longer it is going to take before the traffic light turns green, and estimate a readable time.

For example, in the case where 8:01, 8:04, 8:07, 8:10 . . . are frequent according to action histories of all users as timing at which a user riding on a bicycle starts to move again after stopping at XX traffic light, the estimation section 10d can estimate that the traffic light turns green from red at 8:1+3n (n=0, . . . , 19). In the case where a certain user riding a bicycle stops at such XX traffic light at 8:06, it can be estimated that the user stops for one minute, and then starts to move. Accordingly, "one minute" is estimated as a readable time. Note that, in the case where a system is constructed that can receive control information from traffic infrastructure or an automobile, the estimation section 10d can receive control information from a traffic light at which the user stops, grasp time at which the traffic light turns green from red, and more accurately estimate a readable time.

In the case where the estimation section 10d is capable of estimation with high accuracy which depends on a regular change in traffic infrastructure after estimation based on action histories of all users or estimation based on an action history of a user himself or herself, the estimation section 10d may adopt a result of the estimation.

The adjustment section 10e has a function of adjusting information to be presented to a user to such an amount of information that an audio output is finished within a readable time estimated by the estimation section 10d. The information to be presented to a user is acquired by the presentation information acquisition section 10f. The information to be presented to a user is, as described above, for example, information such as push notification that is automatically presented to the user at appropriate timing. For example, the presentation of new information of a news site, a social networking service (SNS), and the like registered in advance can also be possible in addition to an e-mail notification, an incoming call, an invocation from an application, a notification, a warning of the remaining battery, and the like.

Specifically, for example, the adjustment section 10e is capable of adjusting the number of items to be read, content to be read, or reading speed. In addition, the adjustment section 10e may combine these adjustment methods.

Adjustment of Number of Items to Be Read

The adjustment section 10e calculates, in advance, a time necessary to read one piece of information (such as a news article and e-mail which will be referred to as "item") to be read, calculates how many items can be read within the readable time, and adjusts the number of items to be read in accordance with the readable time. The time necessary to read items may be obtained from the average of times necessary to read items in the past or estimated and obtained from the number of characters of text to be read. For example, the adjustment section 10e can make an adjustment such that ten articles of news are read in the case of a long readable time, and only three articles are read in the case of a short readable time.

Adjustment of Granularity Degree of Content to Be Read

The adjustment section 10e calculates a time necessary for reading for each granularity degree of information in advance like only a title, only a first sentence, or all sentences, and makes an adjustment to an appropriate granularity degree in accordance with the readable time and the number of items that have to be read. For example, the adjustment section 10e can make an adjustment such that the adjustment section 10e reads only the title of news in the case of a short readable time, the adjustment section 10e reads up to the first sentence in the case of a little long readable time, the adjustment section 10e reads up to the summary sentence in the case of a further longer readable time, and the adjustment section 10e reads all the sentences in the case of a sufficient time.

Adjustment of Reading Speed

The adjustment section 10e calculates a reading time for normal speed from the amount of information to be read. In the case where the time is a little shorter than the readable time, an adjustment is made to make the speed higher such that reading is finished within the time. For example, in the case of a little short readable time, the adjustment section 10e can make an adjustment to make the reading speed higher than the normal speed.

The presentation information acquisition section 10f acquires information to be presented to a user. Presentation information may be received through the communication section 11, extracted from the storage section 17, or generated by an application started in the information processing apparatus 1.

The sound synthesizing section 10g has a function of synthesizing sound on the basis of presentation information (text) adjusted by the adjustment section 10e. Once presentation information is converted by the sound synthesizing section 10g into speech, audio information is output from the speaker 15 for audio presentation to a user.

(Communication Section 11)

The communication section 11 is a communication module for transmitting and receiving data to and from another apparatus in a wired/wireless manner. The communication section 11 wirelessly communicates with an external apparatus directly or via a network access point in a scheme, for example, a wired local area network (LAN), a wireless LAN, Wireless Fidelity (Wi-Fi)®, infrared communication, Bluetooth®, short-range/contactless communication, and the like.

(Microphone 12)

The microphone 12 picks up user speech or surrounding environmental sound, and outputs it to the control section 10 as audio data.

(Camera 13)

The camera 13 includes a lens system including an imaging lens, a diaphragm, a zoom lens, a focus lens and the like, a driving system that causes the lens system to perform a focus operation and a zoom operation, a solid-state image sensor array for generating an imaging signal from photoelectric conversion of imaging light obtained in the lens system, and the like. The solid-state image sensor array may be implemented, for example, by a charge coupled device (CCD) sensor array and a complementary metal oxide semiconductor (CMOS) sensor array. For example, the camera 13 is provided to be capable of imaging the area in front of a user with the information processing apparatus 1 (wearable unit) worn by the user. In this case, the camera 13 becomes capable of imaging the scenery surrounding the user, or the scenery in the direction in which the user is looking. In addition, the camera 13 may also be provided to be capable of imaging the face of a user with the information processing apparatus 1 worn by the user. In this case, the information processing apparatus 1 becomes capable of identifying a line-of-sight direction or an expression of the user from a captured image. In addition, the camera 13 outputs the data of a captured image which is converted into a digital signal to the control section 10.

(9-Axis Sensor 14)

The 9-axis sensor 14 includes a triaxial gyro sensor (which detects angular velocity (rotation velocity)), a triaxial acceleration sensor (which is also be referred to as G sensor, and detects acceleration when moving), and a triaxial geomagnetic sensor (which detects a compass and an absolute direction (azimuth)). The 9-axis sensor 14 has a function of performing sensing on a state of a user wearing the information processing apparatus 1 or a surrounding state. Note that the 9-axis sensor 14 is an example of a sensor section. The present embodiment is not limited thereto. For example, a velocity sensor, a vibration sensor, or the like may be further used. At least any of an acceleration sensor, a gyro sensor, and a geomagnetic sensor may be used. In addition, the sensor section may be provided to an apparatus different from the information processing apparatus 1 (wearable unit), or distributed to a plurality of apparatuses. For example, an acceleration sensor, a gyro sensor, and a geomagnetic sensor may be provided to a device (e.g., earphone) worn on a head, and a velocity sensor and a vibration sensor may be provided to a smartphone. The 9-axis sensor 14 outputs information indicating a sensing result to the control section 10.

(Speaker 15)

The speaker 15 reproduces an audio signal in accordance with the control of the control section 10. The audio signal is processed by the sound synthesizing section 10g. In addition, the speaker 15 may have directivity.

(Position Measurement Section 16)

The position measurement section 16 has a function of detecting the current position of the information processing apparatus 1 on the basis of an externally acquired signal. Specifically, for example, the position measurement section 16 is implemented by a global positioning system (GPS) measurement section, receives radio waves from a GPS satellite, detects the position of the information processing apparatus 1, and outputs the detected position information to the control section 10. In addition, the information processing apparatus 1 may sense the position, for example, in accordance with Wi-Fi®, Bluetooth®, transmission and reception to and from a mobile phone/PHS/smartphone or the like, short-range communication, or the like in addition to the GPS.

(Storage Section 17)

The storage section 17 stores a program and a parameter that allows the above-described control section 10 to execute each function. In addition, the storage section 17 according to the present embodiment can accumulate action histories of a user.

(Biometric Sensor 18)

The biometric sensor 18 senses various kinds of biometric information of a user, and outputs it to the control section 10 as biometric sensor data. As described above, examples of the biometric sensor data include pulses, heart rates, perspiration rates, body temperature, brain waves, lines of sight, and the like. Note that at least part of the biometric sensor 18 may be provided to an external apparatus. In this case, biometric sensor data sensed by a biometric sensor of the external apparatus can be received by the communication section 11 via wireless communication, and output to the control section 10.

The above specifically describes the internal configuration example of the information processing apparatus 1 according to the present embodiment.

3. Operation Processing

Figure 6:
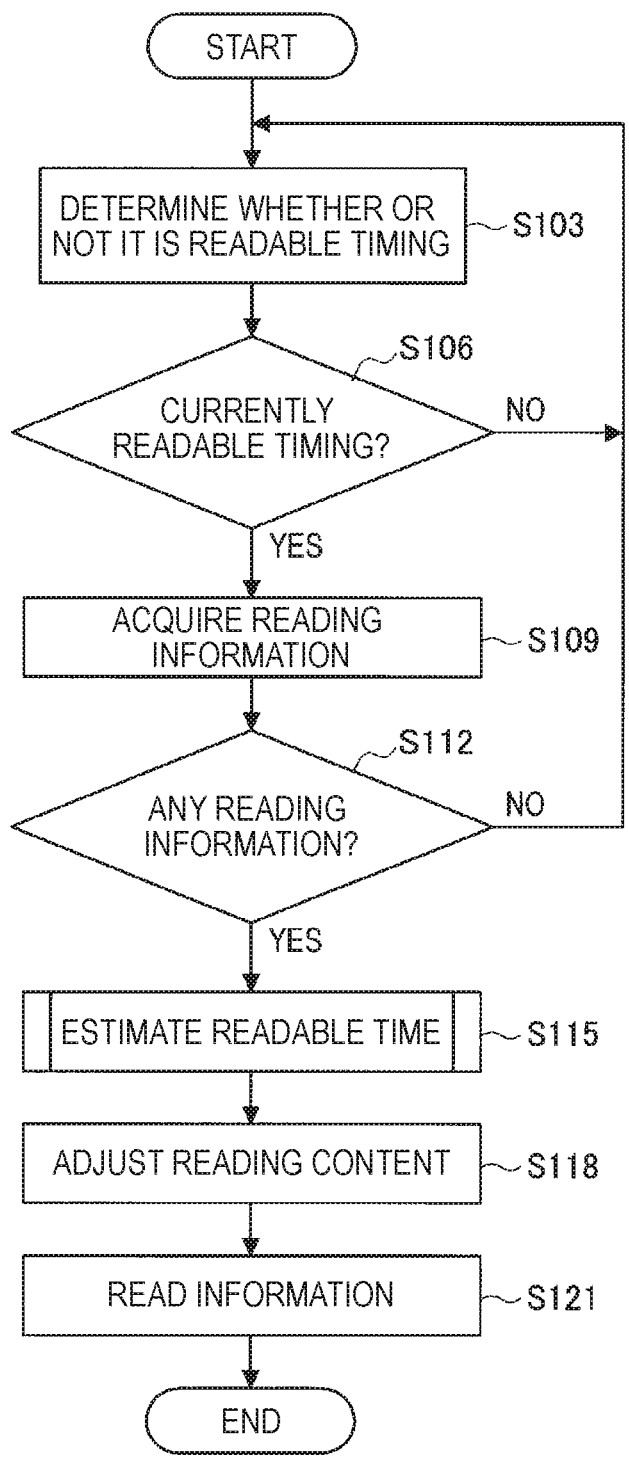
FIG. 6 is a flowchart illustrating reading adjustment operation processing according to the present embodiment.

Next, operation processing of the information processing apparatus 1 according to the present embodiment will be described with reference to FIGS. 6 and 7. FIG. 6 is a flowchart illustrating reading adjustment operation processing according to the present embodiment.

As illustrated in FIG. 6, the determination section 10c of the information processing apparatus 1 first determines whether or not it is readable timing (step S103). That is, the determination section 10c determines in accordance with a recognition result of a user situation and a surrounding situation whether or not a user is currently able to receive audio information presentation.

Next, in the case where it is determined that it is currently readable timing (step S106/Yes), the presentation information acquisition section 10f acquires reading information (step S109). The reading information is information, for example, push notification information or the like that is automatically prepared. Accordingly, the presentation information acquisition section 10f searches for information to be presented to the user at the present moment.

Then, in the case where there is reading information (step S112/Yes), the estimation section 10d estimates a readable time (step S115). Estimation processing for a readable time will be described in detail with reference to FIG. 7.

Next, the adjustment section 10e adjusts reading content (i.e., generates reading content) such that the reading of the presentation information is finished within the estimated readable time (step S118).

The information processing apparatus 1 then uses the sound synthesizing section 10g to convert the adjusted content into speech, and reads the information (audio presentation) from the speaker 15 (step S121).

Next, the estimation processing for a readable time in step S115 above will be described with reference to FIG. 7.

Figure 7:
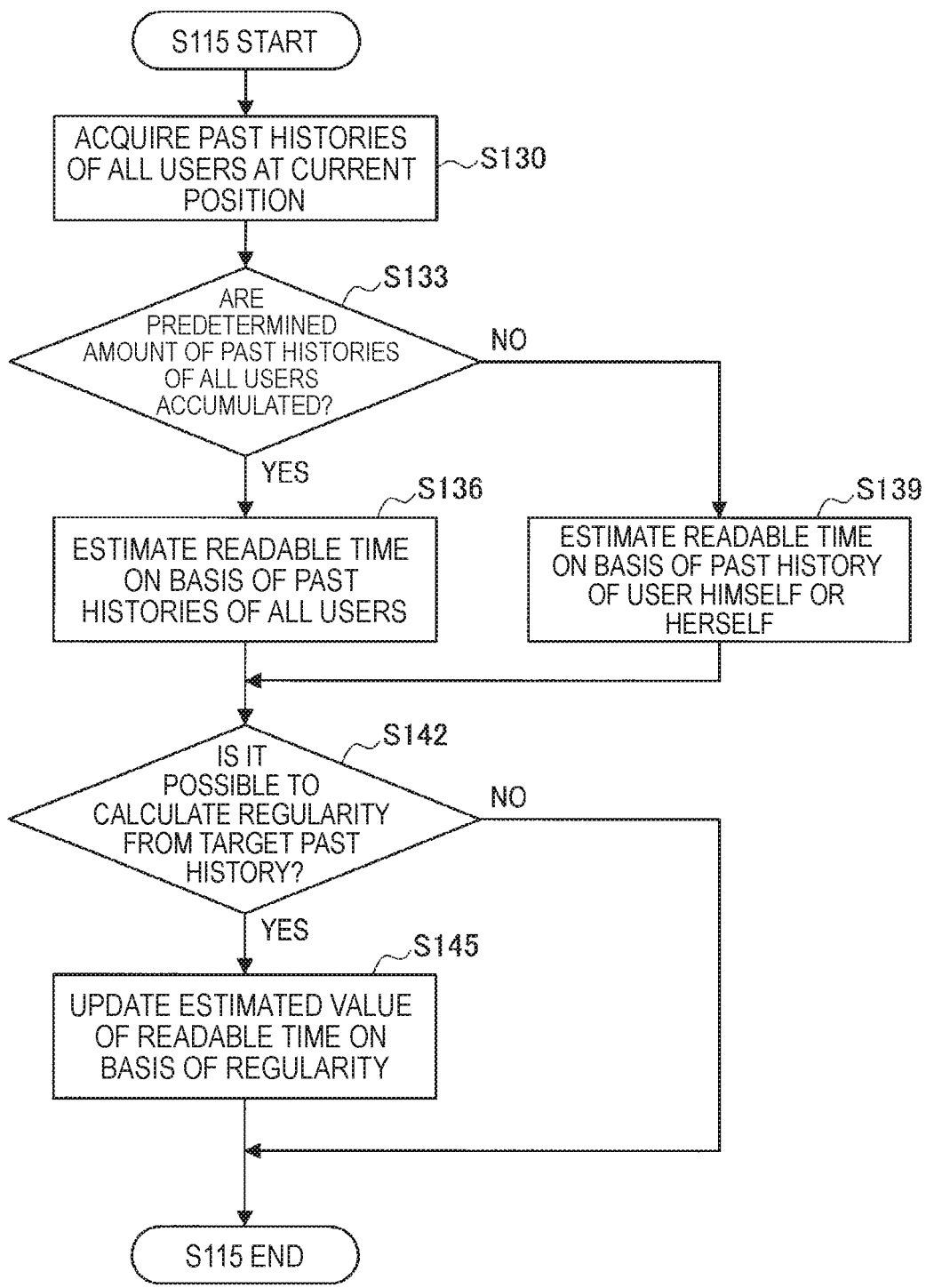
FIG. 7 is a flowchart illustrating readable time estimation operation processing according to the present embodiment.

FIG. 7 is a flowchart illustrating readable time estimation operation processing according to the present embodiment. As illustrated in FIG. 7, the estimation section 10d of the information processing apparatus 1 first acquires past histories of all users at the current position (step S130). The past histories of all the users are, for example, on a server. The estimation section 10d requests the past histories of all the users at the current position from the server along with current position information measured by the position measurement section 16.

Next, in the case where a predetermined amount of past histories of all the users are accumulated (step S133/Yes), a readable time is estimated on the basis of the past histories of all the users (step S136).

Meanwhile, in the case where a predetermined amount of past histories of all the users are not accumulated (step S133/No), a readable time is estimated on the basis of a past history of a user himself or herself (step S139).

Then, the estimation section 10d determines whether or not it is possible to calculate regularity from a target past history (step S142). The regularity is a regular change in traffic infrastructure such as a railroad crossing and a traffic light. In the case where a user situation and a surrounding situation depend on a surrounding traffic infrastructure, taking the regularity of these into consideration makes it possible to estimate a securer readable time.

Next, in the case where it is possible to calculate regularity (step S142/Yes), the estimation section 10d calculates regularity and updates the estimated value of the readable time on the basis of the calculated regularity (step S145).

The above describes the operational processing according to the present embodiment.

4. Modifications

<4-1. First Modification>

Next, a first modification of the present embodiment will be described with reference to FIGS. 8 to 9. In the present modification, a method for reading next information is changed in accordance with the interval ("reading interval" illustrated in FIG. 3) before a user becomes able to receive the next information after receiving information. Specifically, the last content or the relevance to the last content is shown in accordance with the reading interval at the time of the next information presentation, which can thereby make more comfortable information presentation.

(Configuration)

Figure 8:
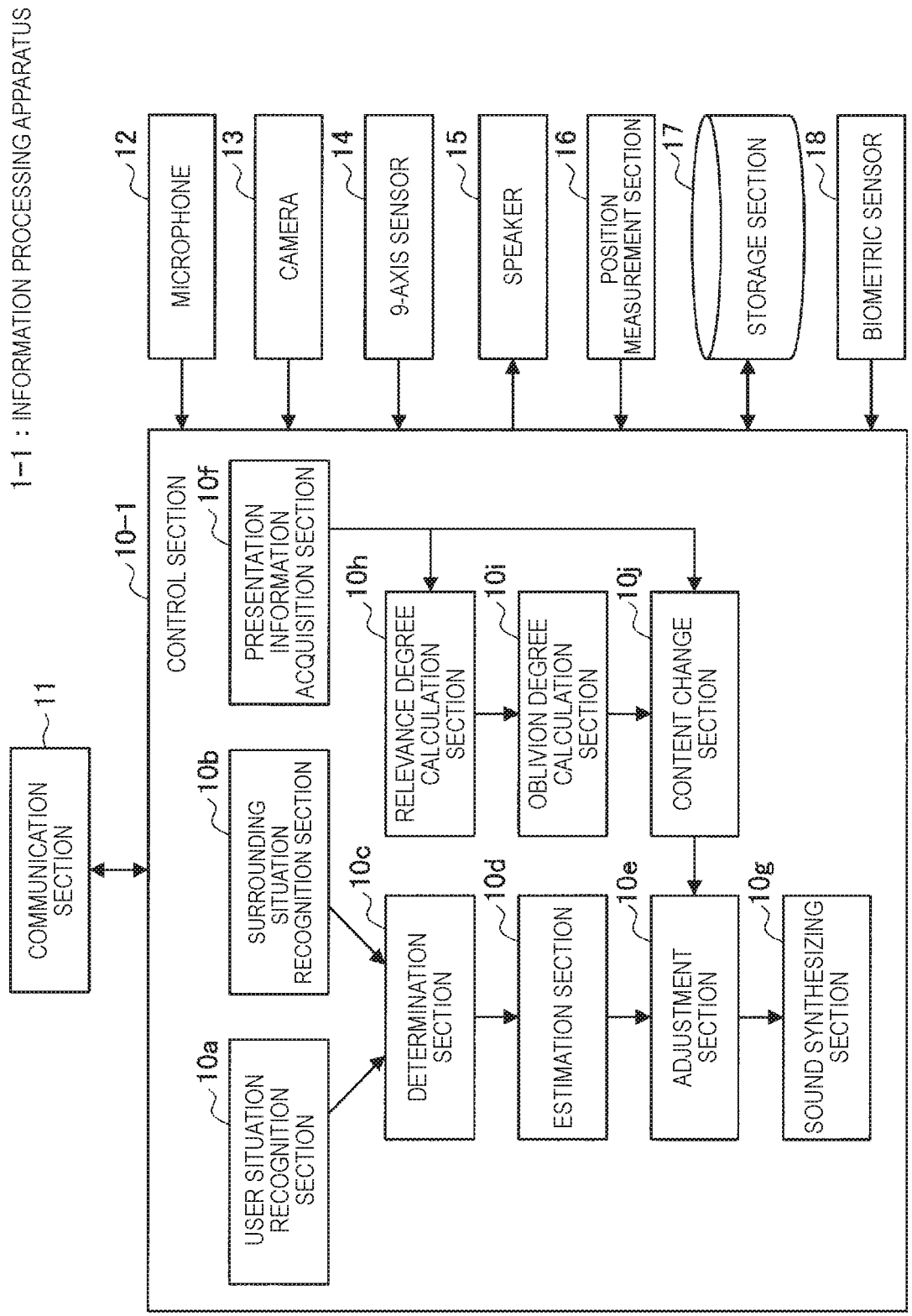
FIG. 8 is a block diagram illustrating an example of a configuration of an information processing apparatus according to a first modification of the present embodiment.

FIG. 8 is a block diagram illustrating an example of the configuration of an information processing apparatus 1-1 according to the present modification. As illustrated in FIG. 8, the information processing apparatus 1-1 includes a control section 10-1, the communication section 11, the microphone 12, the camera 13, the 9-axis sensor 14, the speaker 15, the position measurement section 16, the storage section 17, and the biometric sensor 18.

As illustrated in FIG. 8, the control section 10-1 functions as the user situation recognition section 10a, the surrounding situation recognition section 10b, the determination section 10c, the estimation section 10d, the adjustment section 10e, the presentation information acquisition section 10f, the sound synthesizing section 10g, a relevance degree calculation section 10h, an oblivion degree calculation section 10i, and a content change section 10j.

The components having the same signs as those of the components described with reference to FIG. 2 perform similar processing, so that they will not be described here.

The relevance degree calculation section 10h has a function calculating the relevance degree between content subjected to information presentation last time and content subjected to information presentation this time. As the relevance degree, it is calculated, for example, whether information relates to a common matter (e.g., news relates to the same event), information is of the same type (e.g., genre of information such as news, warning, and notification, information of the same corner in a program, and the like). In the case where the relevance degree is high, information presentation is made by adding an introduction message to recall the last information in accordance with an oblivion degree described below. In the case where the relevance degree is low, there is no need to recall the last information. Accordingly, information presentation about the last information is not made.

The oblivion degree calculation section 10i predicts and calculates as an oblivion degree to what degree a user forgets the content subjected to information presentation last time. For example, the oblivion degree calculation section 10i may calculate an oblivion degree in accordance with the length of a reading interval or the length of a time from the end of the last reading to the start of this reading. In addition, the oblivion degree calculation section 10i may further take, into consideration, an action (talking with another person, watching television, exercising, working, resting, acquiring other information, or the like) taken by a user within the time from the end of the last reading to the start of this reading, and calculate an oblivion degree. For example, as shown in the following expression 1, an oblivion degree (F) may basically increase in proportion to a time t from the last information presentation. However, a user action during the time increases the oblivion degree in some cases.

[Math. 1]

$$F = \alpha T + \Sigma_i \beta_i A_i \quad \text{expression 1}$$

In the expression 1 above, $\alpha$ represents a coefficient related to the interval. $\beta_i$ represents a coefficient related to each user action. In addition, T represents the length (time) of the interval from the last information presentation. $A_i$ represents a user action in the interval T.

The content change section 10j changes the content of information to be presented to a user in accordance with the calculated oblivion degree. For example, the content change section 10j adds an introduction message to the beginning of information to be presented to the user this time in accordance with the magnitude of the oblivion degree. The introduction message mentions the relationship with the last presentation information or the content of the last presentation information. More specifically, in the case where the oblivion degree is smaller than a first threshold, the content change section 10j makes a change into content that makes the introductory remark "This is a continuation." alone. In addition, in the case where the oblivion degree is larger than the first threshold and smaller than a second threshold (here, assume first threshold<second threshold), the content change section 10j makes a change into content that explains a keyword of the last presentation information in the beginning by saying "I will continue ∘∘ corner. I reported XXX earlier." In addition, in the case where the oblivion degree is larger than the second threshold, the content change section 10j makes a change into content that conveys the content of the information presented last time with a simple summary such as one sentence in the beginning by saying "This is ∘∘ corner. I ' . . . ' last time."

(Operation Processing)

Next, the operation processing according to the present modification will be described with reference to FIG. 9. FIG. 9 is a flowchart illustrating reading adjustment operation processing according to the present modification.

Figure 9:
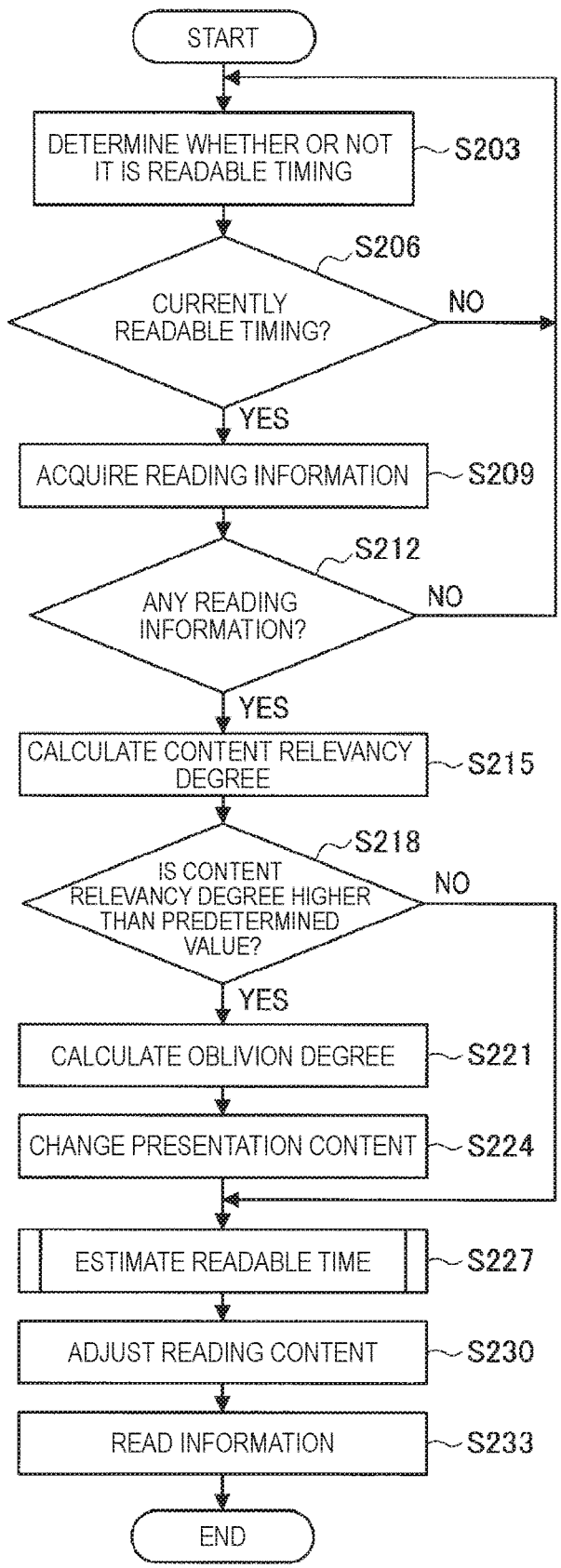
FIG. 9 is a flowchart illustrating reading adjustment operation processing according to the first modification of the present embodiment.

As illustrated in FIG. 9, the determination section 10c of the information processing apparatus 1-1 first determines whether or not it is readable timing (step S203).

Next, in the case where it is determined that it is currently readable timing (step S206/Yes), the presentation information acquisition section 10f acquires reading information (step S209), and determines whether or not the reading information exists (step S212). The processing shown in steps S203 to S212 is similar to the processing shown in steps S103 to S112 described with reference to FIG. 6.

Next, in the case where the reading information exists (step S212/Yes), the relevance degree calculation section 10h calculates the content relevance degree between information presented this time and information presented last time (step S215).

Next, in the case where the content relevance degree is higher than a preset predetermined value (step S218/Yes), the oblivion degree calculation section 10i calculates an oblivion degree (step S221).

Then, the content change section 10j changes the content of presentation information in accordance with the calculated oblivion degree (step S224).

Meanwhile, in the case where the content relevance degree is lower than the preset predetermined value (step S218/No), the content of presentation information is not changed.

Next, the estimation section 10d estimates a readable time (step S227). The estimation processing for a readable time is similar to the processing described with reference to FIG. 7, and will not be described in detail here. Note that the timing of performing the estimation processing for a readable time is not limited to the processing order illustrated in FIG. 9, but may come prior to the calculation of the content relevance degree (step S215 above) or in parallel with the calculation of the content relevance degree.

Next, the adjustment section 10e adjusts reading content such that the reading of the presentation information is finished within the estimated readable time (step S230).

The information processing apparatus 1 then uses the sound synthesizing section 10g to convert the adjusted content into speech, and reads the information (audio presentation) from the speaker 15 (step S233).

<4-2. Second Modification>

Figure 10:
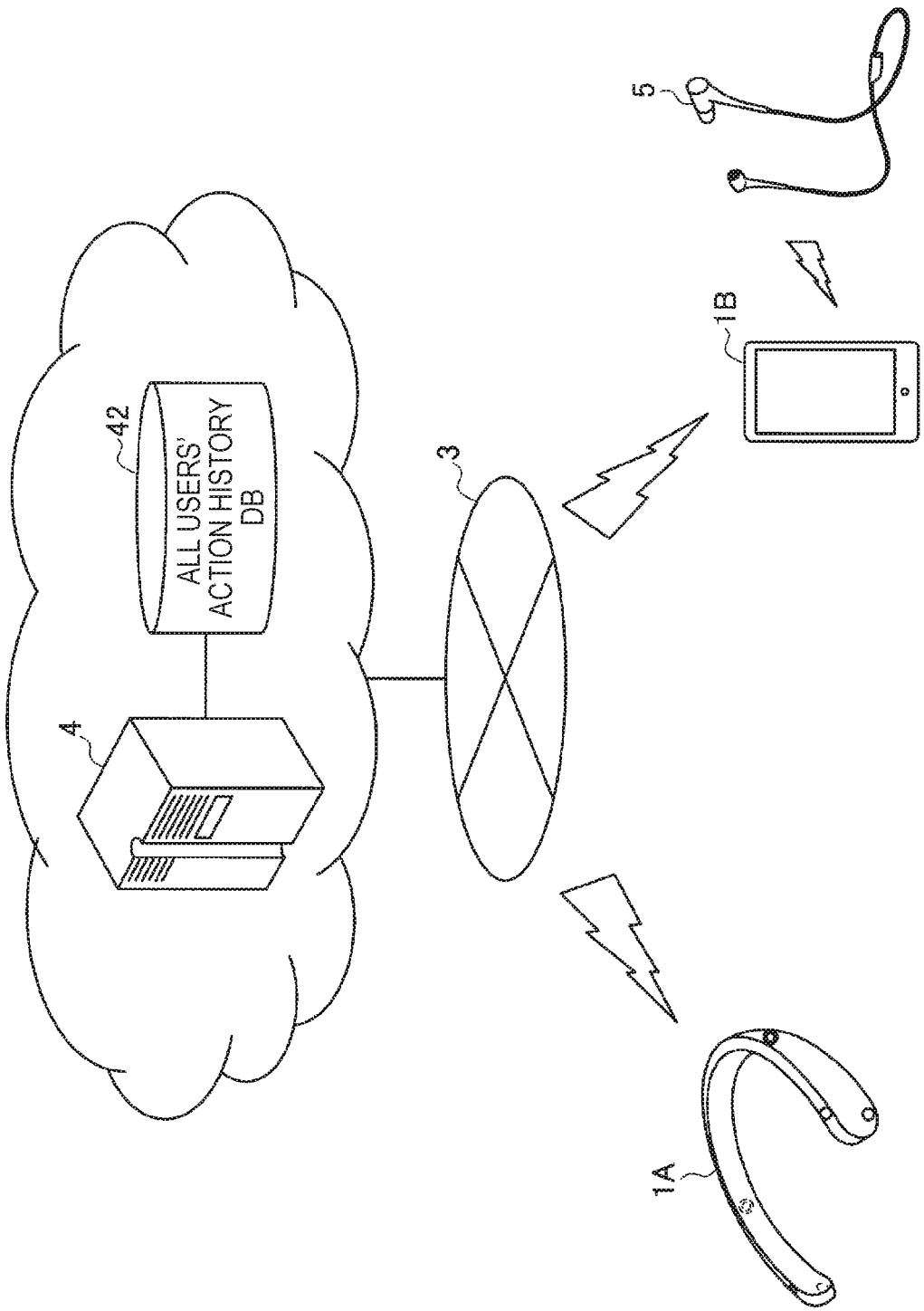
FIG. 10 is a diagram illustrating an example of a system configuration according to a second modification of the present embodiment.

Next, a second modification of the present embodiment will be described with reference to FIGS. 10 to 11. FIG. 10 is a diagram illustrating an example of a system configuration according to the present modification.

As illustrated in FIG. 10, the present embodiment may include a client-server type system. That is, the information processing apparatuses 1 (1A and 1B) are connected to the server 4 via the network 3 as the system configuration.

Both of the information processing apparatuses 1A and 1B are examples of the information processing apparatus 1 according to the present embodiment. The information processing apparatus 1A is, for example, a terminal that is used by a user, and the information processing apparatus 1B is a terminal that is used by another user. The information processing apparatus 1B is implemented, for example, by a smartphone, connected to the earphone 5 in a wireless or wired manner, and can present audio information from the earphone 5. The information processing apparatuses 1A and 1B are connected to the network 3 in a wireless or wired manner, and can transmit and receive data to and from the server 4 on a cloud. Note that the example illustrated in FIG. 10 shows the two information processing apparatuses 1. However, the present embodiment is not limited thereto. A large number of the information processing apparatuses 1 that are used by a large number of users can be connected to the server 4 via the network 3.

The server 4 includes an all users' action history database (DB) 42, accumulates action information transmitted from the information processing apparatus 1A or 1B, and transmits it to an external apparatus as needed. This configuration of the server 4 will be described with reference to FIG. 11.

Figure 11:
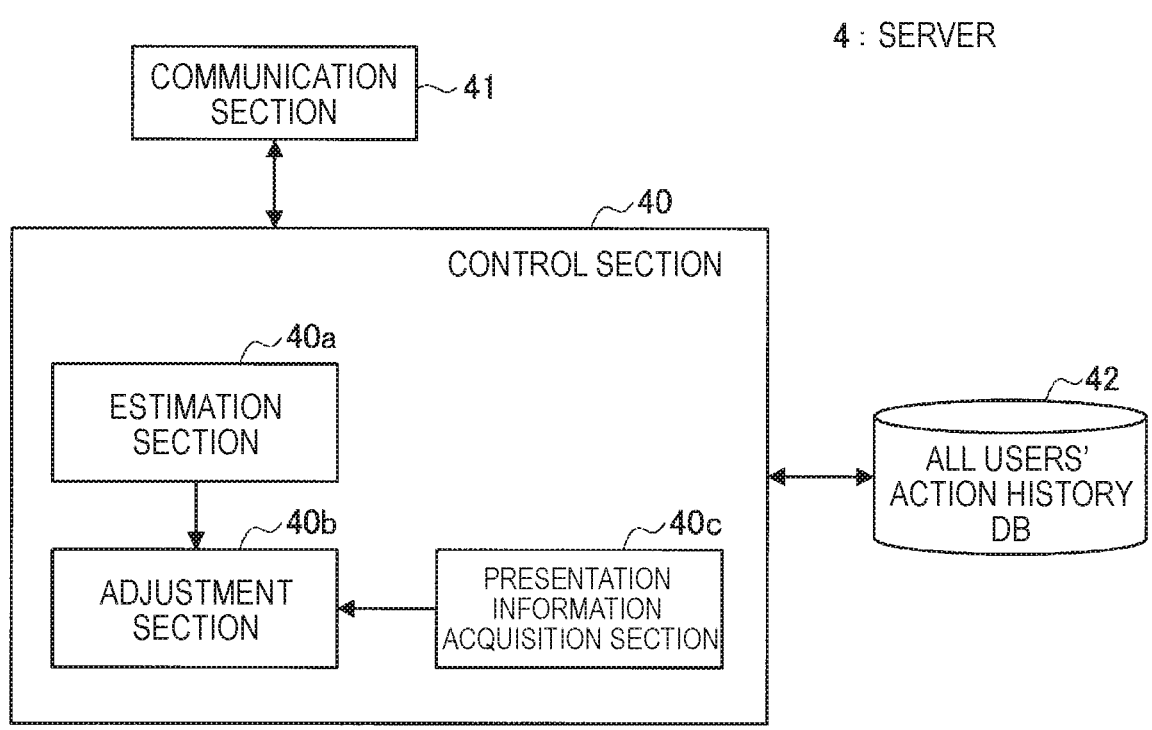
FIG. 11 is a diagram illustrating an example of a configuration of a server according to the second modification of the present embodiment.

FIG. 11 is a block diagram illustrating an example of the configuration of the server 4 according to the present embodiment. As illustrated in FIG. 11, the server 4 includes a control section 40, a communication section 41, and the all users' action history DB 42. The control section 40 can function as an estimation section 40a, an adjustment section 40b, and a presentation information acquisition section 40c. The function of each component is similar to the function of the same component of the information processing apparatus 1.

Note that the communication section 41 can transmit and receive data to and from an external apparatus via the network 3. In addition, the all users' action history DB 42 accumulates action histories of a user which are received from the information processing apparatus 1A or 1B, or the like via the communication section 41.

The server 4 may extract a predetermined action history from the all users' action history DB 42, and return it, for example, in response to a request from the information processing apparatus 1A.

In addition, for example, in response to a request from the information processing apparatus 1A, the server 4 may use the estimation section 40a to estimate a readable time from the average value of readable times in past similar situations of all the users in the case where a certain situation occurs, and return it.

In addition, for example, in response to a request from the information processing apparatus 1A, the server 4 may use the presentation information acquisition section 40c to acquire presentation information for a user, and may return data adjusted such that reading is finished within a readable time estimated by the estimation section 40a.

In addition, the server 4 may be provided with the components corresponding to the sound synthesizing section 10g, and the relevance degree calculation section 10h, the oblivion degree calculation section 10i and the content change section 10j illustrated in FIG. 8.

5. Conclusion

As described above, the information processing apparatus 1 according to an embodiment of the present disclosure estimates a time (i.e., readable time) for which information presentation can be received, and controls the amount of audio information such that listening to the audio information is finished within the time, thereby making it possible to improve the convenience of the audio information presentation.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, it is also possible to create a computer program for causing hardware such as a CPU, a ROM, and a RAM built in the above-described information processing apparatus 1 to perform the functions of the information processing apparatus 1. In addition, there is also provided a computer-readable storage medium having the computer program stored therein.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing apparatus including:

an estimation section configured to, when it is determined that a user is able to receive vocal information presentation, estimate a duration for which it is possible to receive the information presentation; and an adjustment section configured to adjust an amount of information to be presented to the user in accordance with the estimated duration.

(2)

The information processing apparatus according to (1), in which it is determined on a basis of at least any of a situation of the user or a surrounding situation whether or not it is possible to receive the information presentation.

(3)

The information processing apparatus according to (2), in which the situation of the user includes an action of the user, and it is determined in accordance with an action recognition result of the user whether or not the user is able to receive the information presentation.

(4)

The information processing apparatus according to (2) or (3), in which the situation of the user includes a concentration degree of the user, and it is determined in accordance with a calculation result of the concentration degree whether or not the user is able to receive the information presentation.

(5)

The information processing apparatus according to any one of (2) to (4), in which the situation of the user includes a danger degree around the user, and it is determined in accordance with a calculation result of the danger degree whether or not the user is able to receive the information presentation.

(6)

The information processing apparatus according to any one of (2) to (5), in which the adjustment section adjusts the information to be presented to the user to such an amount of information that an audio output is finished within the duration.

(7)

The information processing apparatus according to (6), in which the adjustment section makes an adjustment by increasing or decreasing a number of pieces of the information to be presented to the user.

(8)

The information processing apparatus according to (6) or (7), in which the adjustment section makes an adjustment by changing a granularity degree of the information to be presented to the user.

(9)

The information processing apparatus according to any one of (6) to (8), in which the adjustment section makes an adjustment by changing reading speed of the information to be presented to the user.

(10)

The information processing apparatus according to any one of (1) to (9), in which the estimation section estimates the duration for which it is possible to receive the information presentation, on a basis of a past action history of the user.

(11)

The information processing apparatus according to any one of (1) to (9), in which the estimation section estimates the duration for which it is possible to receive the information presentation, on a basis of past action histories of all users.

(12)

The information processing apparatus according to any one of (1) to (9), in which in a case where past action histories of all users associated with a current position of the user reach a predetermined amount, the estimation section uses action histories of all the users to estimate the duration, and in a case where the past action histories of all the users fall below the predetermined amount, the estimation section uses an action history of the user to estimate the duration.

(13)

The information processing apparatus according to any one of (1) to (9), in which the estimation section extracts regularity of surrounding traffic infrastructure on a basis of past action histories of all users, and estimates the duration.

(14)

The information processing apparatus according to any one of (1) to (13), in which the estimation section estimates the duration on a basis of control information acquired from traffic infrastructure or an automobile.

(15)

The information processing apparatus according to any one of (1) to (14), further including:

a calculation section configured to calculate an oblivion degree of the user; and a change section configured to change the information to be presented to the user in accordance with the calculated oblivion degree.

(16)

The information processing apparatus according to (15), in which the change section adds an introduction message to a beginning of reading of the presentation information, the introduction message being based on information presented last time.

(17)

The information processing apparatus according to (15) or (16), in which the calculation section calculates the oblivion degree on a basis of at least any of a time elapsed since time of last presentation and a user action during the time.

(18)

The information processing apparatus according to any one of (1) to (17), further including:

an acquisition section configured to acquire real-time sensing data regarding a situation of the user or a surrounding situation of the user; and an output section configured to output reading voice for the presentation information adjusted such that reading is finished within a duration for which the user is able to receive the information presentation.

(19)

An information processing method including, by a processor:

estimating, when it is determined that a user is able to receive vocal information presentation, a duration for which it is possible to receive the information presentation; and adjusting an amount of information to be presented to the user in accordance with the estimated duration.

(20)

A program for causing a computer to function as:

an estimation section configured to, when it is determined that a user is able to receive vocal information presentation, estimate a duration for which it is possible to receive the information presentation; and an adjustment section configured to adjust an amount of information to be presented to the user in accordance with the estimated duration.

REFERENCE SIGNS LIST 1, 1A, 1B information processing apparatus
10, 10-1 control section
10a user situation recognition section
10b surrounding situation recognition section
10c determination section 10d estimation section
10e adjustment section
10f presentation information acquisition section
10g sound synthesizing section
10h relevance degree calculation section
10i oblivion degree calculation section
10j content change section
11 communication section
12 microphone
13 camera
14 9-axis sensor
15 speaker
16 position measurement section
17 storage section
18 biometric sensor
3 network
4 server
40 control section
40a estimation section
40b adjustment section
40c presentation information acquisition section
41 communication section
42 all users' action history DB
5 earphone

The invention claimed is:

1. An information processing apparatus, comprising:
a determination section configured to determine a user is able to receive a vocal information presentation;
an estimation section configured to estimate a duration to receive the vocal information presentation, based on the determination the user is able to receive the vocal information presentation;
a relevance degree calculation section configured to calculate a content relevance between the vocal information presentation presented in a first time period and the vocal information presentation presented in a second time period subsequent to the first time period; and
an adjustment section configured to adjust an amount of the vocal information presentation presented to the user based on the estimated duration and the calculated content relevance.

2. The information processing apparatus according to claim 1, wherein
the determination the user is able to receive the vocal information presentation is based on at least one of a situation of the user or a surrounding situation of the user.

3. The information processing apparatus according to claim 2, wherein
the situation of the user includes an action of the user, and
the situation of the user is determined based on the action of the user.

4. The information processing apparatus according to claim 2, wherein
the situation of the user includes a concentration degree of the user, and
the situation of the user is determined based on a calculation result of the concentration degree.

5. The information processing apparatus according to claim 2, wherein
the situation of the user includes a danger degree around the user, and
the situation of the user is determined based on a calculation result of the danger degree.

6. The information processing apparatus according to claim 2, wherein
the adjustment section is further configured to adjust the amount of the vocal information presentation such that an audio output is finished within the estimated duration.

7. The information processing apparatus according to claim 6, wherein
the adjustment section is further configured to adjust by one of an increasing operation or a decreasing operation of a number of pieces of information of the vocal information presentation presented to the user.

8. The information processing apparatus according to claim 6, wherein
the adjustment section is further configured to adjust a granularity degree of the vocal information presentation presented to the user.

9. The information processing apparatus according to claim 6, wherein
the adjustment section is further configured to adjust by a reading speed of the vocal information presentation presented to the user.

10. The information processing apparatus according to claim 1, wherein
the estimation section is further configured to estimate the duration based on an action history of the user.

11. The information processing apparatus according to claim 1, wherein
the estimation section is further configured to estimate the duration based on action histories of a plurality of users.

12. The information processing apparatus according to claim 1, wherein the estimation section is further configured to:
utilize action histories of a plurality of users to estimate the duration when the action histories of the plurality of users associated with a current position of the user reach a specific amount; and
utilize an action history of the user of the plurality of users to estimate the duration when the action histories of the plurality of users fall below the specific amount.

13. The information processing apparatus according to claim 1, wherein the estimation section is further configured to:
extract regularity of surrounding traffic infrastructure based on action histories of a plurality of users; and
estimate the duration based on the extraction.

14. The information processing apparatus according to claim 1, wherein
the estimation section is further configured to the duration based on control information acquired from at least one of traffic infrastructure or an automobile.

15. The information processing apparatus according to claim 1, further comprising:
a calculation section configured to calculate an oblivion degree of the user; and
a change section configured to change the vocal information presentation presented to the user based on the calculated oblivion degree.

16. The information processing apparatus according to claim 15, wherein
the change section is further configured to add an introduction message to a beginning of reading of the vocal information presentation, and
the introduction message is based on the vocal information presentation presented in the second time period.

17. The information processing apparatus according to claim 15, wherein the calculation section is further configured to calculate the oblivion degree based on at least one of a time elapsed since the vocal information presentation presented in the second time period or a user action during the second time period.

18. The information processing apparatus according to claim 1, further comprising:
an acquisition section configured to acquire real-time sensing data corresponding to at least one of a situation of the user or a surrounding situation of the user; and
an output section configured to output reading voice by a reading operation of the vocal information presentation, wherein the reading operation is finished within the estimated duration for which the user is able to receive the vocal information presentation.

19. An information processing method, comprising:
determining a user is able to receive a vocal information presentation;
estimating a duration to receive the vocal information presentation, based on the determination the user is able to receive the vocal information presentation;
calculating a content relevance between the vocal information presentation presented in a first time period and the vocal information presentation presented in a second time period subsequent to the first time period; and
adjusting an amount of the vocal information presentation presented to the user based on the estimated duration and the calculated content relevance.

20. A non-transitory computer-readable medium having stored thereon computer-executable instructions that, when executed by a computer, cause the computer to execute operations, the operations comprising:
determining a user is able to receive a vocal information presentation;
estimating a duration to receive the vocal information presentation, based on the determination the user is able to receive the vocal information presentation;
calculating a content relevance between the vocal information presentation presented in a first time period and the vocal information presentation presented in a second time period subsequent to the first time period; and
adjusting an amount of the vocal information presentation presented to the user based on the estimated duration and the calculated content relevance.

* * * * *